United States Patent

Handziak

[11] 3,835,460
[45] Sept. 10, 1974

[54] ROTARY FIELD SWITCH MEANS FOR MACHINE APPARATUS

[75] Inventor: Louis J. Handziak, Milwaukee, Wis.

[73] Assignee: Joseph Schlitz Brewing Company, Milwaukee, Wis.

[22] Filed: Dec. 4, 1972

[21] Appl. No.: 311,763

[52] U.S. Cl.............. 340/271, 200/29, 340/213 Q
[51] Int. Cl. .......................................... G08b 21/00
[58] Field of Search........... 340/271, 213 Q, 258 C; 200/29, 28, DIG. 1

[56] References Cited
UNITED STATES PATENTS
591,162  10/1897  Fiske.................................. 340/271
3,207,917  9/1965  Martin, Jr. .......................... 340/271

*Primary Examiner*—Glen R. Swann, III
*Attorney, Agent, or Firm*—Andrus, Sceales, Starke & Sawall

[57] ABSTRACT

A switch operating collar encircles a shaft and includes two semi-cylindrical metal members interconnected with abutting end faces by suitable set screws for releasably clamping the collar to the shaft. A circumferentially extended slot or keyway is machined or otherwise formed in the outer peripheral surface of the one member. The side edges of the slot are formed along a chordal line to define relatively sharp discontinuities in the face or periphery of the collar. The collar screws are accessible from the semi-circular member containing the slot. Shaft bearings firmly support the signal drive shaft and clamped collar unit, or units, for rotation about a predetermined axis. A metal proximity sensor head is mounted aligned with the peripheral surface of the collar. The circumferential extent of the slot is slightly larger than the operative corresponding dimension of the sensor head. The axial width of the collar unit is slightly less than the sensor head such that the screw holes do not generate operative output signals. Each movement of the slot past the sensing head generates a pulse signal having an inclined leading and trailing edge. A threshold detector responds at a selected level to produce a square wave output signal for providing digital logic signals.

6 Claims, 2 Drawing Figures

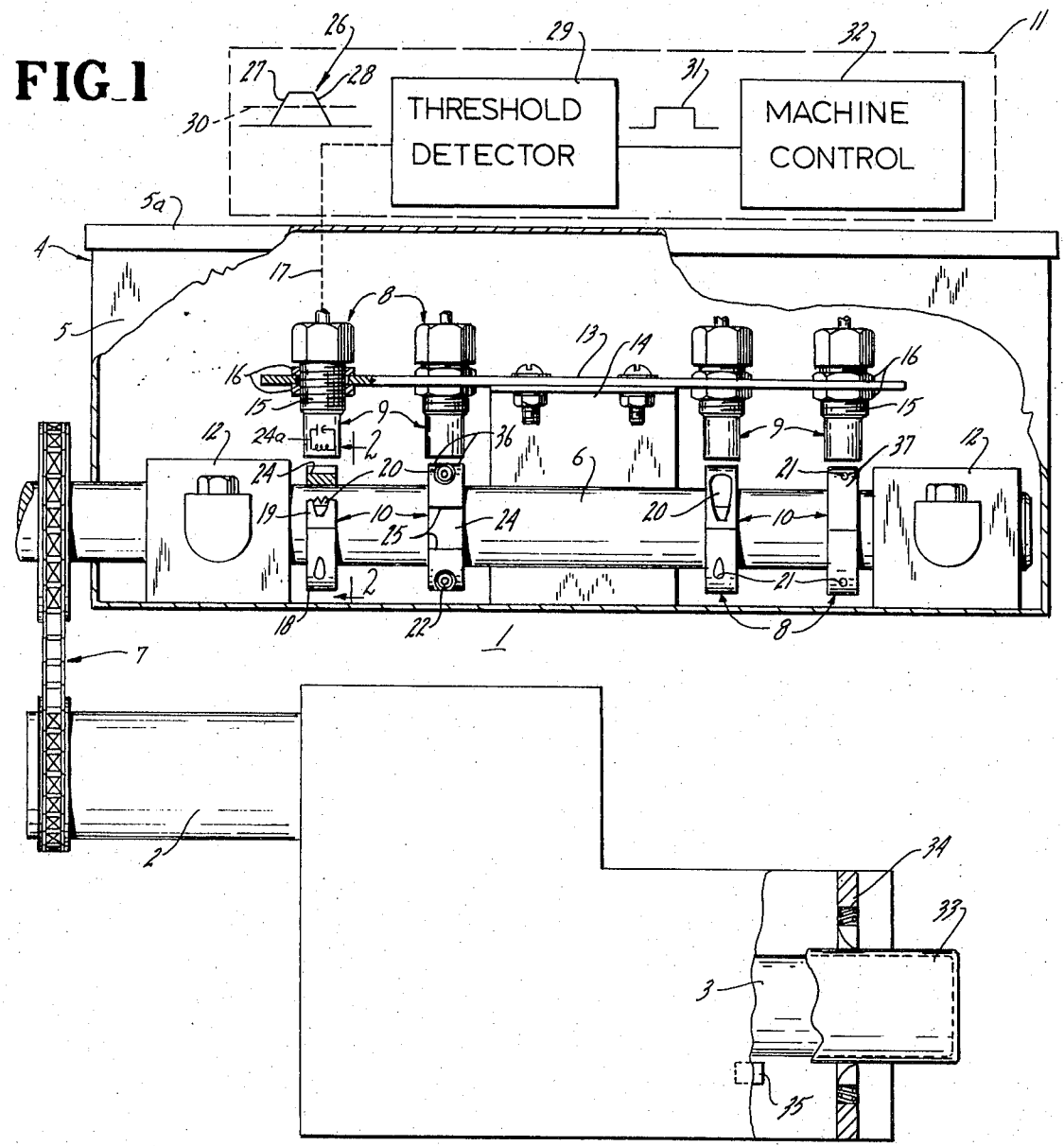

ROTARY FIELD SWITCH MEANS FOR MACHINE APPARATUS

BACKGROUND OF THE INVENTION

This invention relates to a rotary machine driven switch apparatus producing timed signals for controlling or monitoring the operation of the machine.

In the operation of manufacturing machinery and the like, the operation and functioning of the machine may be desirably controlled or monitored through the use of sensing devices associated with the machinery. For example, in metal can manufacturing machinery the body may advantageously be formed through an extruding process with the top separately formed through presses and rolling machinery. In order to establish an economic operation the machinery must operate at very high forming frequencies which are typically in excess of 100 operations per minute. In order to maintain a smooth and relatively long operating life it is important to be able to rapidly detect any malfunction in the operation of the machinery. In the body extruding apparatus, the ram position should be periodically checked to ensure that it is moving through the several required positions to first extrude the blank and strip the extruded formed cam body from the ram. If proper monitoring of the extruder is not made, a malfunction may occur which results in damage to the extruder apparatus which requires extensive down-time and a corresponding loss of production. Various limit switches as well as mechanical rotary sliding contact devices have been employed in monitoring of forming machinery.

Further, the machinery may require readjustment and a corresponding readjustment of the signal or limit switches. The adjustment may, at times, require relatively small changes in order to maintain proper high speed operation.

Mechanical devices are subject to the usual mechanical failures as well as requiring relatively complicated drives. Sliding contact devices are subject to contamination particularly in manufacturing environments such as in metal can manufacturing industry. Adjustment of the devices is difficult and time consuming. There is, therefore, a distinct need for a reliable non-contacting switch apparatus which will permit coupling to the machinery and actuation of a sensor through a non-contacting member.

SUMMARY OF THE PRESENT INVENTION

The present invention is particularly directed to an energy field sensor employing a rotating metal collar unit and a sensor located adjacent the periphery of the collar unit. In accordance with the teaching of the present invention, the collar unit is formed of a plurality of elements which are releasably interconnected to permit clamping about an existing shaft or a single shaft in a rapid and simple manner. The outer periphery of the collar is formed with a radial discontinuity to define a distinct separation between a metal portion and a non-metal portion. The sensor is responsive to the discontinuity to generate a control or monitoring signal. The signal shaft forms a part of or is coupled to be driven in synchronism with the machine working element and thus provides a precise time and position sensing relation output signal which can be employed to control the machine or otherwise monitor the functioning of the machine. The multiple piece collar permits essentially infinite adjustment on the shaft and thereby permits infinite adjustment of the timing of the output signal with respect to the machine operating position. The sensing unit can, of course, employ suitable solid state electronics. The head may be enclosed to protect it from the surrounding environment where required so as to make the switching apparatus essentially immune to contamination such as oil or the like in the surrounding atmosphere. A plurality of switches may be coupled to a main drive shaft such as in a can forming machine or a single shaft may be provided or coupled to the machine working element, with individual switching apparatus secured in axially spaced relation along the shaft. The single signal shaft may be connected through a chain and sprocket drive to provide for simultaneous actuation of all of the switching devices, with the position of the collar units controlling the time that the several output signals are generated.

The non-contacting switch construction essentially eliminates switch failure and sensing failure and thereby essentially completely eliminates the machine down time associated with more conventional switching systems. Further, the separable collar construction permits the installation and removal to existing shaft assemblies directly without the necessity of extensive disassembly and reassembly of the shaft in the supporting means therefore.

More particularly, in a preferred construction of the present invention the collar unit is constructed of two semicylindrical metal members interconnected with abutting end faces by suitable set screws. A circumferentially extended slot or keyway is machined or otherwise formed in the outer peripheral surface of the one member. The side edges of the slot are preferably formed along a chordal line to define relative sharp discontinuities in the face or periphery of the collar. The collar screws are accessible from the semi-circular member containing the slot. The collar is mounted on a sensor shaft within a suitable housing having shaft bearings to firmly support the signal drive shaft and associated collar unit or units for rotation about a predetermined axis. The sensor units are mounted within the enclosure with the sensor units aligned with the peripheral surface. The sensor is any suitable metal proximity detecting signal sensing device and may advantageously employ a resonant type circuit with the output directly related to the presence and absence of the metal collar. The circumferential extent of the slot is slightly larger than the operative corresponding dimension of the sensor head. Each movement of the slot past the sensing head generates a pulse signal having an inclined leading and trailing edge. The sensor signal is applied to a threshold detector which triggers when the slope reaches a selected level to produce a square wave output signal with the leading and trailing edges available for providing digital logic signals.

Applicant has found that the combination of the split collar and the signal conditioning electronic circuit particularly adapts the present invention to manufacturing machinery such as employed in metal can forming high speed machinery.

BRIEF DESCRIPTION OF DRAWING

The drawing furnished herewith illustrates a preferred construction of the present invention in which the above advantages and features are clearly disclosed as well as others which will be readily understood from the following description of such embodiment.

In the drawing:

FIG. 1 is a side fragmentary elevational view of a machine with a switching unit constructed in accordance with the present invention mounted thereon and with the electronic processing circuit shown in block diagram and with the signals generated by the unit diagrammatically shown thereon; and FIG. 2 is a vertical section taken generally on line 2—2 of FIG. 1 with parts broken away and sectioned to more clearly show the mounting means.

DESCRIPTION OF ILLUSTRATED EMBODIMENT

Referring to the drawing and particularly to FIG. 1, the present invention is shown applied to a metal forming machine 1 having a main drive shaft 2 for operating of a suitable metal forming ram 3 such, for example, as employed in the extrusion of a single piece beverage can body. The operation of the machine is monitored by a sensing assembly 4 mounted to the machine and constructed in accordance with the present invention. Generally, the sensor assembly 4 includes an open top enclosure or housing 5 which may have a removable cover 5a. The housing 5 is suitably secured to the machine, with a common signal drive shaft 6 of assembly 4 located therein. Shaft 6 protrudes from housing 5 and is coupled as by a chain and sprocket drive 7 to the main drive shaft 2. The shaft 6 is thus driven in precise timed relationship with main drive shaft 2 and its angular orientation provides a precise interrelationship for indication of the position of the ram 3. The illustrated sensing assembly 4 includes a plurality of switching units 8 which are mounted within the housing 5 in axially distributed relation along the shaft 6. Generally, each of the units 8 is similarly constructed and includes a fixed sensing head 9 and a rotating actuator 10 which is particularly constructed in accordance with the teaching of the present invention and interconnected to the shaft 6 for corresponding positioning. The output of the sensing head 9 is a pulse signal coupled to a signal processing and control circuit 11 which may be interconnected to control the operation of the machine, to provide an indication of the sequential machine operation, or to provide an alarm signal in response to selected malfunction.

In the illustrated embodiment of the invention, the shaft 6 is rotatably supported within the housing 5 by similar bearings 12 at the opposite ends of the housing 5. The bearings 12 firmly support the shaft in precise, spaced alignment of the switch actuators 10 relative to the heads 9.

The heads 9 are similarly supported in fixed relation to actuators 10 on a common support plate 13 which overlies the shaft 6 within the housing 5. The illustrated plate 13 is bolted or otherwise secured to the upper wall of an inverted U-shaped bracket 14 which is disposed over the central portion of shaft 6 between the bearings 12. The U-shaped bracket 14 is welded or otherwise rigidly attached to the bottom wall of the housing 5 to locate the plate 13 and the interconnected sensing heads 9 in precise, spaced interrelationship to the shaft 6 and the switch actuators 10.

More particularly, each of the sensing heads 9 is generally a cylindrical-shaped member having a threaded portion 15 extended through a corresponding opening in plate 13 and adjustably positioned with respect to the periphery of the switch actuator by a pair of lock nuts 16 to the opposite side of the plate 13. The end or face of the head 9 adjacent the actuator 10 is a planar member located adjacent the periphery of the switch actuator 10 which is adapted to actuate the sensor head 9 and provide timed spaced output signals in accordance with the rotation of the shaft 6. The output of the head 9 is an electrical pulse signal coupled through a suitable shield cable or the like as shown by the dotted lines 17 to the signal circuit 11.

The sensing head 9 in a particularly satisfactory apparatus is a metal proximity sensing means which responds to the discontinuity of a metal member moving past the head. Although any suitable metal proximity sensing device might be employed, Applicant has employed an LC type sensing head employing inductive-capacitive coupled elements as diagrammatically shown. In particular, a sensor manufactured and sold by the Allen-Bradley Company, Catalogue No. 965709 and more fully disclosed in their Bulletin 1720–A 1701 has been employed. The sensing head 9 is thus an electronic signal generating circuit having coupling elements with the characteristic dependent upon the presence and absence of a metallic material adjacent the face of the head.

In accordance with the present invention, the actuator 10 is a removable collar unit having a plurality of separable parts which permit direct attachment and removal with respect to the shaft 6 and in particular without disassembly of the signal shaft, special linkages or the like. Thus, as shown most clearly in FIG. 2, the switch actuator includes a pair of semicylindrical complementing collar members 18 and 19 defining an encircling collar with the inner radius corresponding essentially to the radius of the shaft 6. Thus the collar members 18 and 19 fit about the shaft 6 in close clamping relationship thereto. In the illustrated embodiment of the invention the collar members 18 and 19 are similarly connected to the opposite sides, with the right half broken away and sectioned for clearly illustrating the connecting means. Threaded aligned openings 20 and 21 are provided in the members 18 and 19 passing on a chordal line through the abutting faces. A threaded bolt or cap screw 22 threads into the aligned threaded openings 20 – 21 to firmly interconnect the collar members 18 and 19. The collar member 19 is recessed to accept the head of the attachment screw 22 and the opposite screw end terminates within the collar member 18 to avoid protrusions from the periphery of the split collar unit and permit close spacing of head 9. The opposite side is similarly interconnected by a screw assembly 23.

When the screw units 22 and 23 are drawn up, the collar assembly is fixed to the shaft 6 and establishes precise and corresponding positioning with respect to the shaft 2.

The collar 19 is provided with a circumferential slot 24 extending throughout the width of the collar and particularly member 19. The circumferential length of the slot on the periphery of collar 19 is slightly longer than the effective width of the sensing head 9 and particularly the electrical sensing elements forming a part of such head which are schematically illustrated at 24a and which are coupled to the collar assembly 18 – 19. Thus for each rotation of the actuator 10, the head 9 is completely separated from the collar member 19 by a significant distance which, in essence, decouples the collar from the head 9. The depth of the slot 24 is not critical as long as it provides for the desired decoupling. The slot 24, however, is preferably formed with at least parallel spaced side walls 25 rather than inwardly radial type side walls to improve the characteristic of the output pulse.

The slot 24 is gradually coupled and decoupled to the head 9. As a result, an output pulse 26 is generated such as shown in FIG. 1. The pulse generally includes a leading sloping portion or ramp 27 and an oppositely extending terminal portion or ramp 28 interconnected by an upper flat portion to define a truncated signal. The pulse is connected via the lead 17 to the signal circuit 11 which preferably includes a threshold detector 29 which is set to trigger or fire at an intermediate level of the pulse 26; for example, as at the level of line 30. The output of the trigger circuit is therefore a square wave 31 as shown to the output side of the threshold detector 29. This provides a sharp leading edge and a similar trailing edge, either or both of which can be applied to a machine control 32 or other suitable monitoring means. Thus the pulse signals can be employed not only to control the apparatus but to signal a suitable alarm, drive a counting mechanism or any other suitable interrelated means associated with the operation of the machine 1.

The processing circuit can, of course, employ any desirable electronic circuitry but is preferably a relatively high voltage threshold system, for example, a fifth volt system widely employed in industry. The detector 29 may be set to trigger at approximately eight volts to provide a positive output signal which is suitable for driving of the machine controlled circuitry or the logic of the machine controlled circuitry.

Further a suitable inverter, not shown, may be used to provide a proper logic signal to the threshold unit 29. As applied to a can body forming machine, it may be desirable to determine whether or not a partly formed can body 33 has been stripped as by an automatic stripper 34 from the ram 3 at a particular ram position. If the can body is still on the ram 3, a malfunction signal should be fed back through the signal processing network to control or shut down the machine, sound an alarm or the like. The presence or absence of a can can be readily determined by a suitable sensor 35 placed adjacent the ram 3 and particularly at the location or position of the ram 3 at the time of the analysis. The switch unit 8 provides an interrelated control of the connection of sensor 35 to selectively enable the circuit thereof. Similarly, in the cover for forming of the blank for the body, the desired location may be checked at various times in order to produce a signal interrelated with some other signal to maintain proper operation of the apparatus and to shut down the apparatus or signal an alarm before a damaging condition is established.

The pulse signal 26 may, of course, have certain spikes or extraneous signals superimposed thereon and the illustrated signal is an idealized curve. Suitable compensating networks will be provided to minimize or eliminate such extraneous signals depending on the accuracy required to eliminate erratic triggering of the threshold detector.

The socket screws 22 and 23 are introduced into the collar member 19 which also includes the circumferential actuating slot 24. This is desirable in connection with the open top housing 5 to permit access and removal of the collars 18 – 19 without disassembling of the shaft 6 from the housing and the like. In assembly and subsequent adjustment, the ram 3 is positioned in the proper location when a signal is to be generated. The collar members 18 and 19 loosely attached to permit manual rotation on the shaft 6 and, in particular adjustment to precisely align the slot 24 with respect to the head 9. This will ensure the proper signal generation with the movement of the head 9. This construction thus facilitates the convenient and accurate location of the collar actuator 10 with respect to the sensing heads 9.

Although the collar is shown interconnected to the shaft by a pair of cap screws or the like, it can, of course, be otherwise constructed as a multiple part separable member. For example, the one side may be provided with a hinged construction with the other side provided with a set screw or other connecting releasable clamp.

In the illustrated embodiment, the switching apparatus is enclosed by the housing 5. Such enclosure is not essentially in many applications. For example, Applicant has found that the apparatus provides a reliable operation when exposed to an oil-mist atmosphere such as encountered in metal beverage can forming plants. Where an enclosure is provided it is important that the collar be readily accessible to permit attachment and removal from the shaft directly and particularly without the necessity of disassembling of the timing shaft and the associated bearing supports and the like. Further, the connection should not generate false trigger signals. In the illustrated embodiment, the screw openings 20 and 21 only partially span the collar and thus maintain a metal edge as at 36 and 37 adjacent head 9 as the openings move past the head. This prevents forming of a signal which reaches the threshold level 30.

The individual switching apparatus 8 shown in the drawings are spaced significantly for purposes of simplicity and clarity of illustration. They may be very closely spaced if desired or necessary to minimize the space requirements, as the discontinuity in one collar will not affect the head of an immediately adjacent unit.

Further, within the broadest aspects of the present invention, the actuating discontinuity provided in the collar unit can be otherwise constructed. For example, a projection on a collar member could be employed to selectively couple a relatively small metal portion to the head to effect the generation of the pulse signal. The position of the sensing head may, however, creep outwardly with operation and move toward the collar structure. If a projection member is employed and the head moves slightly into the path thereof the head may be severely damaged. With the relatively large peripheral surface provided by the slotted collar any movement is apt to be counteracted by the peripheral surface riding on the face of it and moving the head outwardly therefrom and preventing movement to a damaging position. Further, the collar with the slot may be readily constructed with a minimum of expense and is particularly adapted to multiple machinery apparatus in a relatively large plant and particularly where various machines may require adjustment and replacement of the particular collar constructions.

The head position relative to the slot controls the sensitivity of the sensor and the adjustable mounting permits proper spacing with the desired clearance to produce a proper pulse output with the rotation of the actuator.

In a practical application, the actuating collars can be made of any diameter to accommodate existing machine shafts. Thus, a plurality of different sizes might be made for different machines or different parts of the same machine.

The present invention has been found to provide a reliable non-contacting pulse signal generator which can be readily employed in a commercial manufacturing environment and provide reliable output with a minimum amount of maintenance as a result of essentially low wear.

Various modes of carrying out the invention are contemplated as being within the scope of the following claims particularly pointing out and distinctly claiming the subject matter which is regarded as the invention.

I claim:

1. A switching apparatus producing timed spaced signals in accordance with a rotating input for monitoring a machine operation, comprising a signal shaft rotatably mounted and having an input means adapted to be coupled to a machine drive, a collar actuator unit having an outer circular peripheral surface and including a plurality of interconnected elements encircling said shaft and clamped to said shaft, each of said elements being formed of solid material, said collar actuator unit having a releasable interconnecting means between at least two of said elements to permit direct attachment and removal with respect to said shaft by release of said releasable interconnecting means, said collar unit having a material discontinuity slot extended radially inwardly from said peripheral surface and circumferentially of the shaft, said material discontinuity including parallel front and rear walls extending along chordal planes, and a sensing head unit mounted generally perpendicular to the shaft axis in alignment with the actuator unit and mounted adjacent the outer periphery of said collar actuator unit and responsive to said material discontinuity slot in the periphery of the collar unit to generate an output signal.

2. A switching apparatus producing timed spaced signals in accordance with a rotating input for monitoring a machine operation, comprising a signal shaft rotatably mounted and having an input means adapted to be coupled to a machine drive, a collar actuator unit including a plurality of interconnected elements encircling said shaft and clamped to said shaft, said collar actuator unit having a releasable interconnecting means between at least two of said elements to permit direct attachment and removal with respect to said shaft by release of said releasable interconnecting means, said collar unit having a material discontinuity extended circumferentially of the shaft, a sensing head unit mounted adjacent said collar unit and responsive to said material discontinuity in the collar unit to generate an output signal, said collar actuator unit being a cylindrical member defining a circular outer peripheral surface and one of said plurality of elements being releasably interconnected to the adjacent elements by a means extending through aligned openings in the adjacent elements, said openings having a width less than the axial width of the elements to maintain metal portions to the outer surface of the element, said discontinuity being formed in the periphery of said one element, and said sensing head unit being a metal proximity detecting means mounted adjacent the periphery of said collar actuator unit.

3. A switching apparatus producing timed spaced signals in accordance with a rotating input for monitoring a machine operation, comprising a signal shaft rotatably mounted and having an input means adapted to be coupled to a machine drive, a collar actuator unit including a plurality of interconnected elements encircling said shaft and clamped to said shaft, said collar actuator unit having a releasable interconnecting means between at least two of said elements to permit direct attachment and removal with respect to said shaft by release of said releasable interconnecting means, said collar unit having a material discontinuity extended circumferentially of the shaft, a sensing head unit mounted adjacent said collar unit and responsive to said material discontinuity in the collar unit to generate an output signal, said collar unit including a pair of semi-cylindrical metal members with mating end surfaces defining an inner bore essentially corresponding to the diameter of the signal shaft, said releasable means including a pair of interconnecting elements located on diametrical opposite sides of the collar and extending normal to the mating surfaces and through aligned openings in the members at said mating surfaces to firmly interconnect the members, said members having walls at said openings to maintain a metal surface adjacent the sensor aligned with the openings.

4. The switching apparatus of claim 3 wherein said discontinuity constitutes an axial slot in the outer periphery of one semi-cylindrical member, the circumferential length and width of said slot being greater than the effective length and width of the aligned sensing head unit.

5. A switching apparatus producing timed spaced signals in accordance with a rotating input for monitoring a machine operation, comprising a signal shaft rotatably mounted and having an input means adapted to be coupled to a machine drive, a collar actuator unit including a plurality of interconnected elements encircling said shaft and clamped to said shaft, said collar actuator unit having a releasable interconnecting means between at least two of said elements to permit direct attachment and removal with respect to said shaft by release of said releasable interconnecting means, said collar unit having a material discontinuity extended circumferentially of the shaft, a sensing head unit mounted adjacent said collar unit and responsive to said material discontinuity in the collar unit to generate an output signal, said collar unit includes a pair of semi-cylindrical metallic members having flat abutting mating end surfaces defining an inner bore essentially corresponding to the diameter of the signal shaft, said releasable means including a pair of interconnecting screw elements located on diametrical opposite sides of the collar and extending normal to the mating end surfaces and threaded into aligned openings in the members at said mating end surfaces to firmly interconnect the members, said screws having operating heads disposed within one of said members for securing and removing of the collar members from the shaft, and said discontinuity constituting a removed portion extended inwardly from the outer periphery of the member within which said screw operating heads are disposed.

6. The switching apparatus of claim 5 wherein said discontinuity constitutes an inwardly extended slot, the circumferential length of said slot being greater than the effective width of the aligned sensing head.

* * * * *

UNITED STATES PATENT OFFICE
CERTIFICATE OF CORRECTION

Patent No. 3,835,460      Dated September 10, 1974

Inventor(s) LOUIS J. HANDZIAK

It is certified that error appears in the above-identified patent and that said Letters Patent are hereby corrected as shown below:

Column 4, Line 15, after "suitable" cancel "shield" and insert --- shielded ---;

Column 5, Line 36, before "volt" cancel "fifth" and insert --- fifteen ---.

Signed and sealed this 11th day of February 1975.

(SEAL)
Attest:

RUTH C. MASON
Attesting Officer

C. MARSHALL DANN
Commissioner of Patents
and Trademarks